W. W. SPADONE.
PACKING.
APPLICATION FILED MAY 10, 1911.

1,064,022.

Patented June 10, 1913.

WITNESSES

INVENTOR
Walter W. Spadone
BY
ATTORNEYS

UNITED STATES PATENT OFFICE.

WALTER W. SPADONE, OF NEW YORK, N. Y., ASSIGNOR TO GUTTA PERCHA & RUBBER MANUFACTURING COMPANY, OF NEW YORK, N. Y., A CORPORATION OF NEW YORK.

PACKING.

1,064,022.      Specification of Letters Patent.      Patented June 10, 1913.

Application filed May 10, 1911. Serial No. 626,295.

*To all whom it may concern:*

Be it known that I, WALTER W. SPADONE, a citizen of the United States, and a resident of the borough of Brooklyn, county of Kings, city and State of New York, have invented certain new and useful Improvements in Packings, of which the following is a specification.

My invention relates to packings and has for its object to construct such a packing of a plurality of layers, in which different ingredients have been incorporated so that by curing said packing, different characteristics will develop in different layers as for instance, a difference in the relative degree of hardness and softness thereof. Heretofore it has been attempted to secure the above result, for instance in packings for steam pipes, by placing the uncured sheet or packing in operative position and then relying on the heat of the steam passing through the pipes to properly cure the said packing. The difficulty with this proceeding resides in the fact that the uncured packing applied in this manner is soft without any substantial body and is ofttimes blown out by the pressure of the steam before any vulcanization has occurred. Furthermore the degree of heat varies and cannot be controlled in a manner to secure a uniform result or a maximum of perfection so that even if not blown out a packing of this description is very unreliable and faulty.

The principal object of my invention is to overcome these objections by producing the finished packing and curing it under conditions where a uniform result and maximum of perfection may be secured and before said packing is used.

My invention will be fully described hereinafter and the features of novelty will be pointed out in the appended claim.

Reference is to be had to the accompanying drawings in which—

Figure 1:
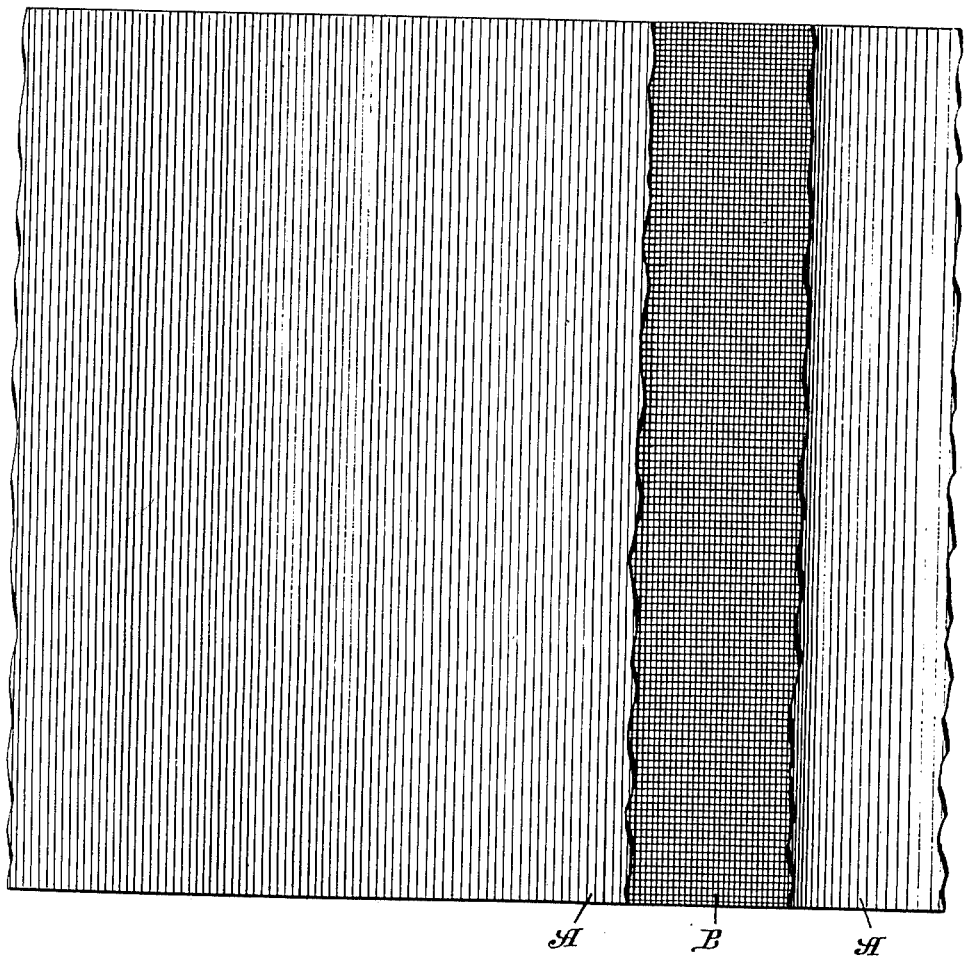
Figure 2:

Figure 1 is a plan view of my improved sheeting with parts broken away and Fig. 2 is a cross-section thereof.

In the drawings the outside layers A are made of rubber or other suitable materials so constituted that said layers will always remain relatively soft and pliable even under the influence of heat or other finishing processes. The intermediate layer B is made of a material, such as rubber in which a suitable ingredient, for instance sulfur, has been incorporated so that during the curing operation this layer will become relatively hard or tough while still retaining its pliability or elasticity. If material other than rubber is used the same is similarly combined with an ingredient tending to harden the said material without making it brittle during the particular finishing process most satisfactory in each particular instance. The layers are suitably united in superposed layers either as shown or in other combinations as may be desired and then subjected to the curing or other finishing process to produce the finished packing. After the packing has been properly cured or otherwise finished so that the layers become combined it may be used for various purposes such as a sheet packing or as a foundation from which packing rings may be cut or for any other purpose for which its peculiar construction adapts it. The pliability of the several layers permits the packing to be equally adapted for use in connection with curved and with straight surfaces. The relatively soft layers serve to allow for expansion and contraction of the medium which is packed and fill all crevices and apertures to secure a perfectly tight joint and the hard, tough inner layer adds strength and prevents leakage and blowing out of the packing. My invention thus comprises a series of layers, having relatively soft and hard characteristics and completely finished and cured before being used and having all the advantages of a packing which is either entirely hard or entirely soft without having any of the disadvantages or objections of either of these last named forms. The toughness and elasticity of the layer B will also serve to maintain or return said packing in or to its normal shape or condition.

It is to be understood that my improved packing may be constructed of any suitable material.

By bringing my improved packing to its finished condition before the same is placed in use, the said packing may be used as a packing to prevent the escape of cold water, cold air or other gases under compression and is not restricted to use in connection with heated fluids or gases as is the case with packings which are applied in an unfinished state and rely on the heat of steam or other fluids passing through the apparatus or structure thus packed to bring them to a finished state.

Various changes in the specific form shown and described may be made within the scope of the claim without departing from the nature of my invention.

I claim:—

As a new article of manufacture, a packing comprising outside layers of rubber vulcanized to a relatively soft state, and an intermediate layer connected therewith and composed of rubber vulcanized to a relatively hard state.

In testimony whereof I have hereunto set my hand in the presence of two subscribing witnesses.

WALTER W. SPADONE.

Witnesses:
JOHN A. KEHLENBECK,
M. H. LOCKWOOD.